United States Patent [19]
Hamlyn

[11] Patent Number: 4,709,626
[45] Date of Patent: Dec. 1, 1987

[54] FOLDABLE CHICKEN HOLDER

[75] Inventor: George J. Hamlyn, West Beach, Australia

[73] Assignee: Hamlyn Overseas Trading Company Pty Ltd, Australia

[21] Appl. No.: 843,778

[22] Filed: Mar. 25, 1986

[30] Foreign Application Priority Data

Sep. 13, 1985 [AU] Australia .............................. PH2412

[51] Int. Cl.⁴ .............................................. A47J 43/18
[52] U.S. Cl. ......................................... 99/426; 99/345; 99/449; D7/409
[58] Field of Search ................. 99/426, 419, 449, 415, 99/418; 211/181; D7/409

[56] References Cited

U.S. PATENT DOCUMENTS

| D. 253,156 | 10/1979 | Bengloff | 99/426 X |
| D. 270,608 | 9/1983 | Spanek | D7/409 |
| 2,597,127 | 5/1952 | Rahr | 99/449 X |
| 3,392,665 | 7/1968 | Harnest | 99/426 |
| 4,027,583 | 6/1977 | Spanek | 99/426 X |
| 4,450,759 | 5/1984 | Steibel | 99/426 X |

Primary Examiner—Timothy F. Simone

[57] ABSTRACT

A chicken holder to hold a chicken while it is being cooked, the holder having a hollow bowl and a central upstanding member to pass into the interior of the chicken. The member is removable from the base for cleaning and washing, and in use the holder holds the chiekcn vertical with the legs of the chicken extending into the bowl.

7 Claims, 14 Drawing Figures

FOLDABLE CHICKEN HOLDER

This invention relates to a foldable chicken holder, more particularly a holder for cooking a chicken in an oven.

BACKGROUND OF THE INVENTION

Chickens are usually cooked domestically by either being roasted in a baking dish, or being placed on a rotary spit within an oven. Many people prefer the chicken to be cooked on a rotary spit instead of resting on a baking dish. However, by cooking on a rotary spit the juices drip down off the bird onto a collecting tray.

It is an object of this invention to provide a holder whereby a chicken may be cooked in an oven in the manner of a rotary spit or rotisserie, but without utilizing a rotary member. Also it is an object of this invention to provide a holder for a chicken to allow the chicken to be automatically basted.

BRIEF STATEMENT OF THE INVENTION

Thus there is provided according to the invention, a chicken holder, the holder comprising a bowl having a peripheral upstanding side wall, and at least one central upstanding member extending upwardly axially of the bowl, said member being substantially of open construction so that when a chicken is placed over the upstanding member with the legs of the chicken extending into the bowl, the chicken is supported with the interior of the chicken open so that cooking can also take place from the interior due to the hot air passing thereinto, and basting of the chicken takes place due to the juices from the chicken collecting in the bowl, the member being readily removable from the bowl for cleaning, washing, storage and transport.

According to a further form of the invention there is provided a foldable chicken holder, the holder comprising a bowl, having a peripheral upstanding side wall, and a pair of elongated "U" shaped members, each "U" shaped member having a laterally extending leg from each side which is adapted to be clipped into and pivoted to the upstanding side wall, one "U" shaped member being displaced 90 degrees to the other "U" shaped member, the two "U" shaped members engaging at the upper extremity whereby the "U" shaped members may be folded down into a flat position, or be removed from the pivotal connection for cleaning purposes.

BRIEF DESCRIPTION OF THE DRAWINGS

Referring to the drawings.

DESCRIPTION OF THE PREFERRED EMBODIMENT

Figure 1:
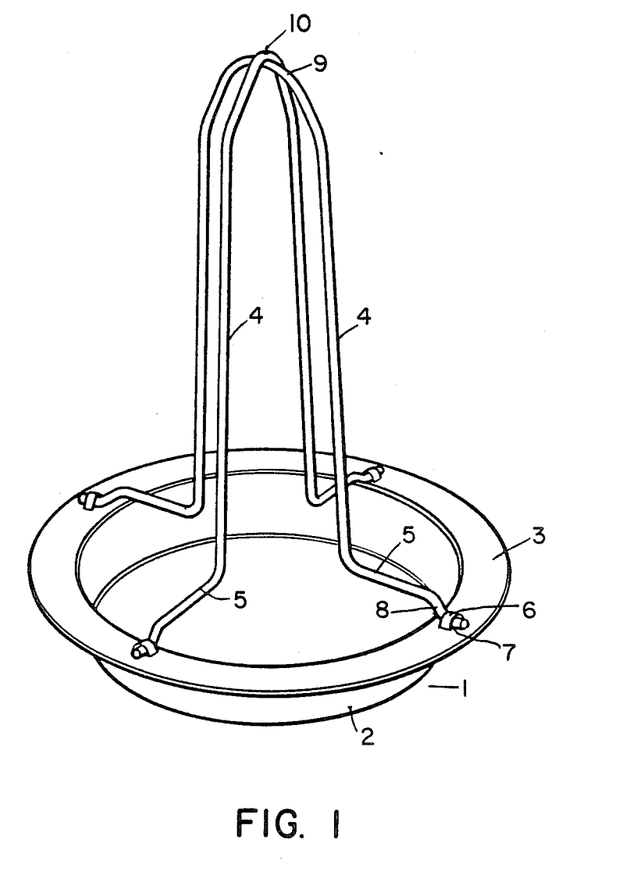
FIG. 1 is a perspective view of one embodiment of the invention.
Figure 2:
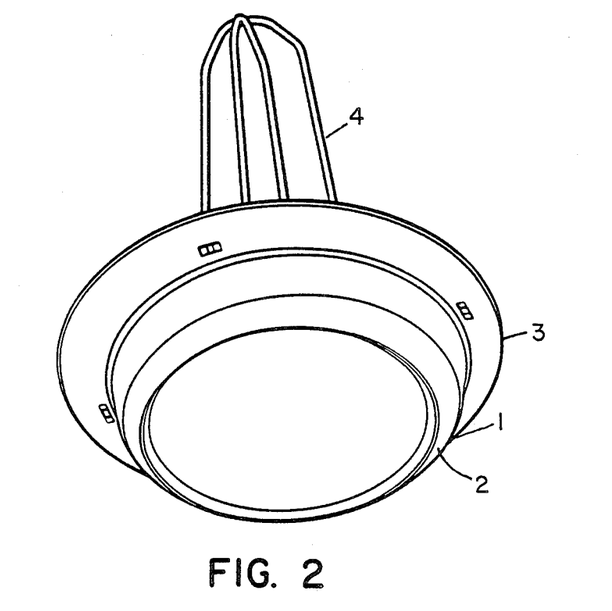
FIG. 2 is a perspective view from the bottom thereof.

The bowl 1 of the holder can be of any suitable material such as stainless steel or aluminium and is preferably circular, with an upstanding side wall 2, the side wall terminating in a laterally extending peripheral flange 3.

Each "U" shaped member 4 can be of stainless steel rod and is formed as an elongated "U" shape with the free ends 5 extending outwardly away from each other in a parallel manner.

Each member is adapted to be clipped into pivot means on the side wall or flange of the bowl, and in one form, a portion 6 of the flange 3 can be split and upset upwardly to thus form a socket 7 into which the end 5 of the "U" shaped member 4 may engage. By suitably deforming or upsetting the adjacent end of the "U" shaped member abutment means 8 are provided to prevent the "U" shaped member protruding right through the socket or aperture formed in the bowl and thus each "U" shaped member can be clipped into position.

The two "U" shaped members 4 are situated at an angle of 90 degrees to each other, and are so shaped that they resiliently engage each other at the upper end 9. Thus, each member at its upper end 9, can have a small notch 10 to engage the other member so that they are clipped into and retained in position.

With the members so positioned, the bird can then be placed downwardly over the "U" shaped members and the legs of the bird can then be positioned into the bowl so that during cooking any juices and the like would run down the surface of the bird and into the bowl.

During cooking, these juices would then evaporate up around both the inside and outside of the bird automatically basting the bird, and any juices remaining in the bowl after cooking can be used for making a gravy or the like. Due to the shape of the members 4 the interior of the bird is kept open to allow cooking and basting to occur therein due to the hot air being able to enter the bird.

Figure 3:
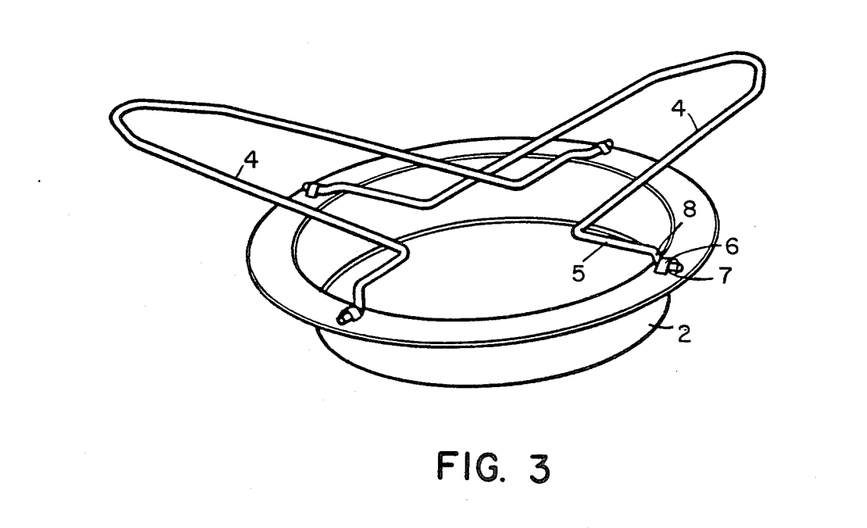
FIG. 3 is a perspective view in the folded position.

As shown in FIG. 3 the members can be folded flat for storage and packaging, and it will be seen that the members can easily be removed by slightly compressing the members 4 to remove the free ends 5 from the socket 7 for washing, cleaning and storage. The fact that it is folded and also able to be dismantled is of advantage particularly for washing and hygienic means.

In the following description of the various embodiments similar features and portions thereof are identified by like numerals.

Figure 4:
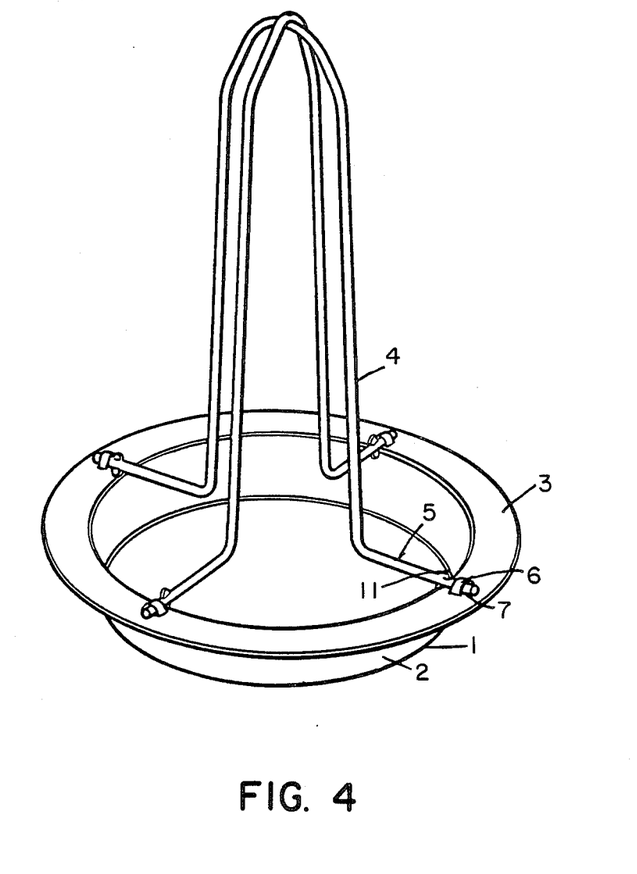
FIG. 4 is a perspective view of the second embodiment.

FIG. 4 shows a further embodiment of the invention wherein the free end 5 of members 4 are straight, and in order to locate and prevent the free ends 5 from passing through the socket 6 too far, the free ends 5 are upset by stamping small flanges or protrusions 11 on the free ends 5 to thus locate the free ends and allow folding and removal of the members 4 as desired.

Figure 5:
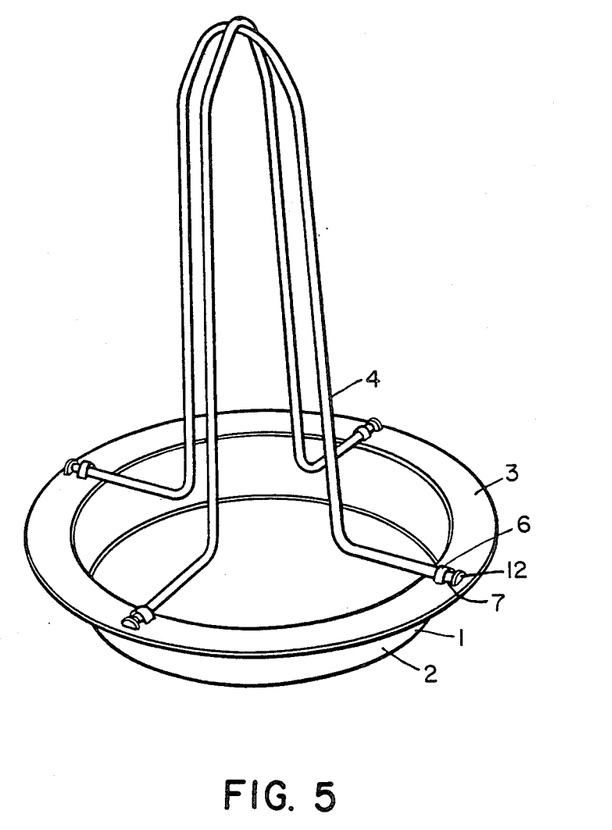
FIG. 5 is a perspective view of the third embodiment.

FIG. 5 shows an embodiment where the free ends 5 are located by stops 12 formed on the flange 3 so that the free end 5 abuts against the stops. The stops may be pressed out of the flange by stamping a semi-circular portion and bending upwardly to form the stop 12.

Alternatively, the stop 12 can be welded or otherwise attached for example by spot welding or by contact welding.

Figure 6:
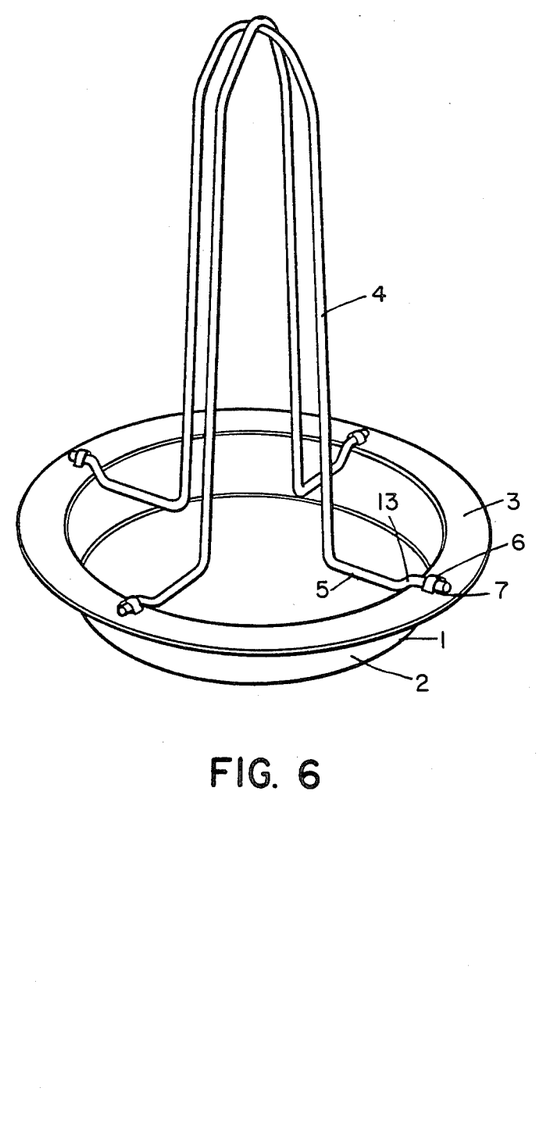
FIG. 6 is a perspective view of the fourth embodiment.

The embodiment shown in FIG. 6 is similar to that shown in FIGS. 1 to 3 except that the legs 4 are slightly longer and the location of the free end 5 is achieved by bending the free ends upwardly at 13, the bend 13 abutting the wall 2 and the edge of flange 3 to locate the free ends 5.

Figure 7A:
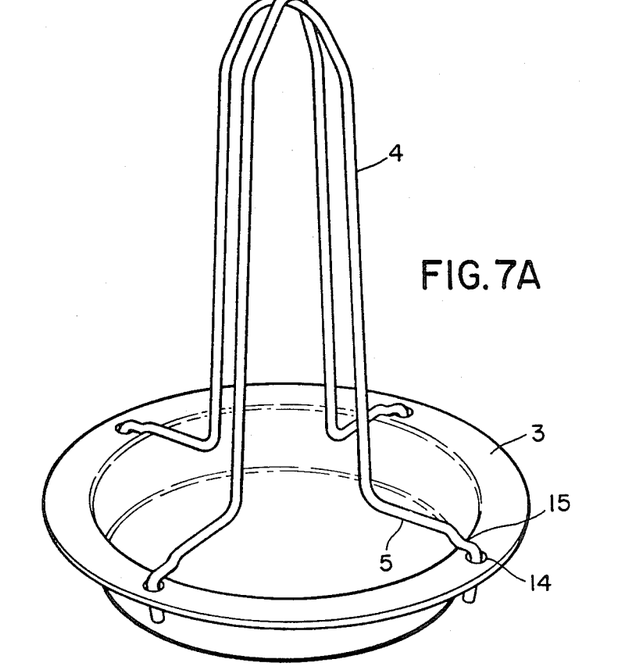
FIGS. 7A and 7B are perspective views of the fifth embodiment.
Figure 7B:
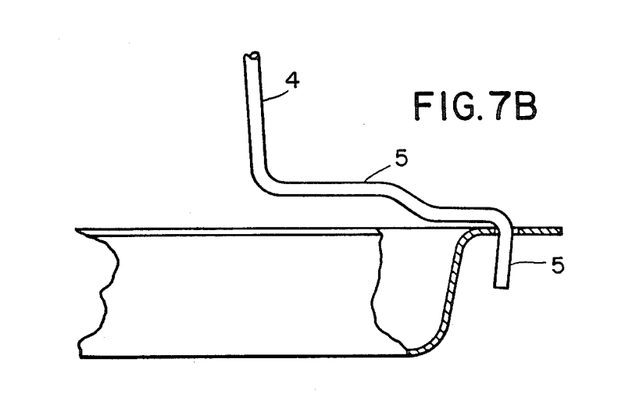

In FIGS. 7A and 7B the free ends 5 of the member 4 are located in holes 14 in flange 3. Each free end 5 has a bend portion 15 and a further horizontal portion and another bend portion to engage in the holes 14. As shown the portion 15 is shown spaced from the side wall 2 for clarity reasons, while in practice the portion 15 would engage and rest on the side wall 2 to locate the free ends.

Figure 8:
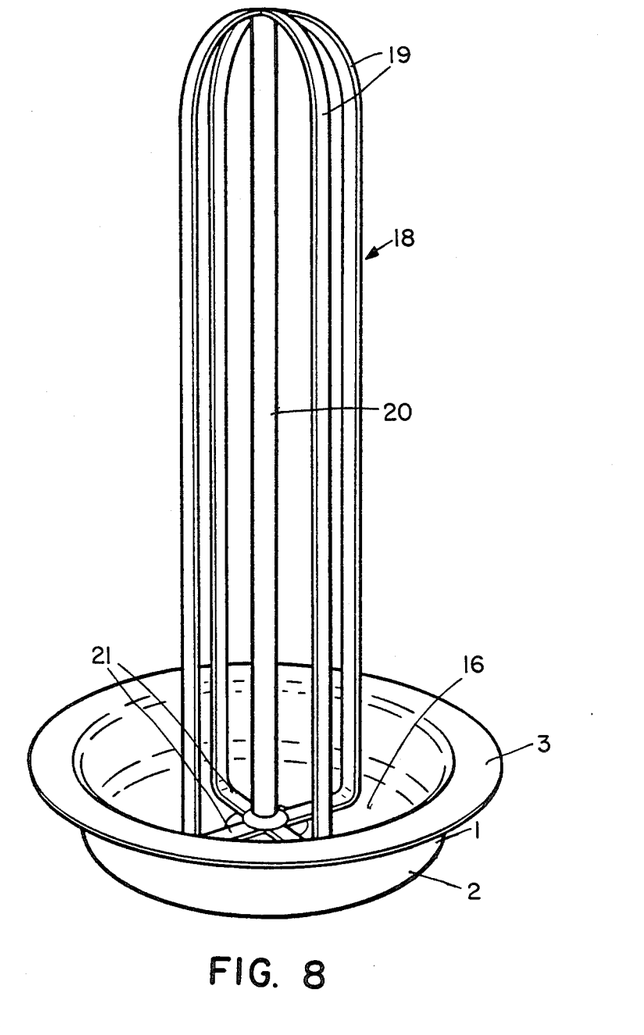
FIG. 8 is a perspective view of the sixth embodiment.
Figures 10, 11:
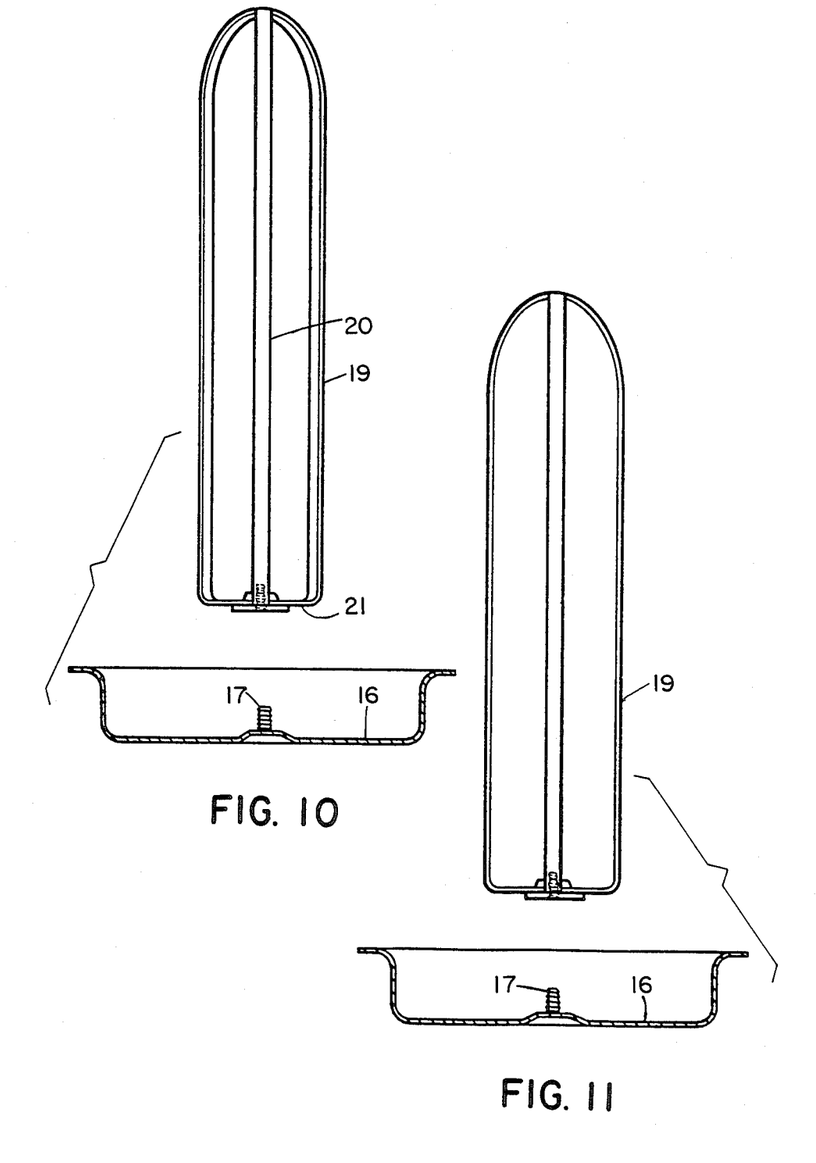
FIG. 10 is an exploded view of the embodiment of FIG. 9.
FIG. 11 is an exploded view of the embodiment of FIG. 8.

FIGS. 8 and 11 show a still further embodiment with FIG. 11 showing the holder in the exploded form, again having a bowl 1 with the side wall 2 and flange 3. To the centre of the base 16 there is provided a stud or screw 17 attached as by welding. To the screws 17 there is removably attached a framework 18 comprising a pair of "U" shaped members 19 mounted on a central rod 20, the rod being attached to the curved upper ends of the members, and to horizontal portions 21 of the members 19. The bottom of the rod 20 is threaded to be attached to the screws 17 attached to the base 16. In this way the "U" shaped members can be removed for cleaning and storage, and reattached for use.

Figure 9:
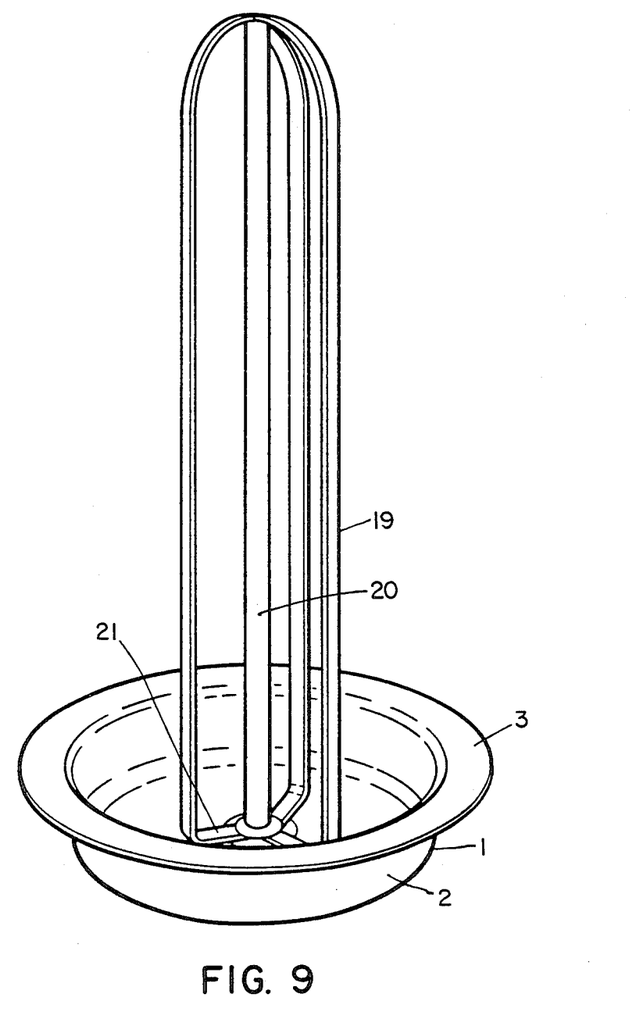
FIG. 9 is a perspective view of the seventh embodiment.

FIGS. 9 and 10 show a similar form to that of FIGS. 8 and 11, except that instead of there being four members there are only three, the unit being otherwise similar.

Figure 12:
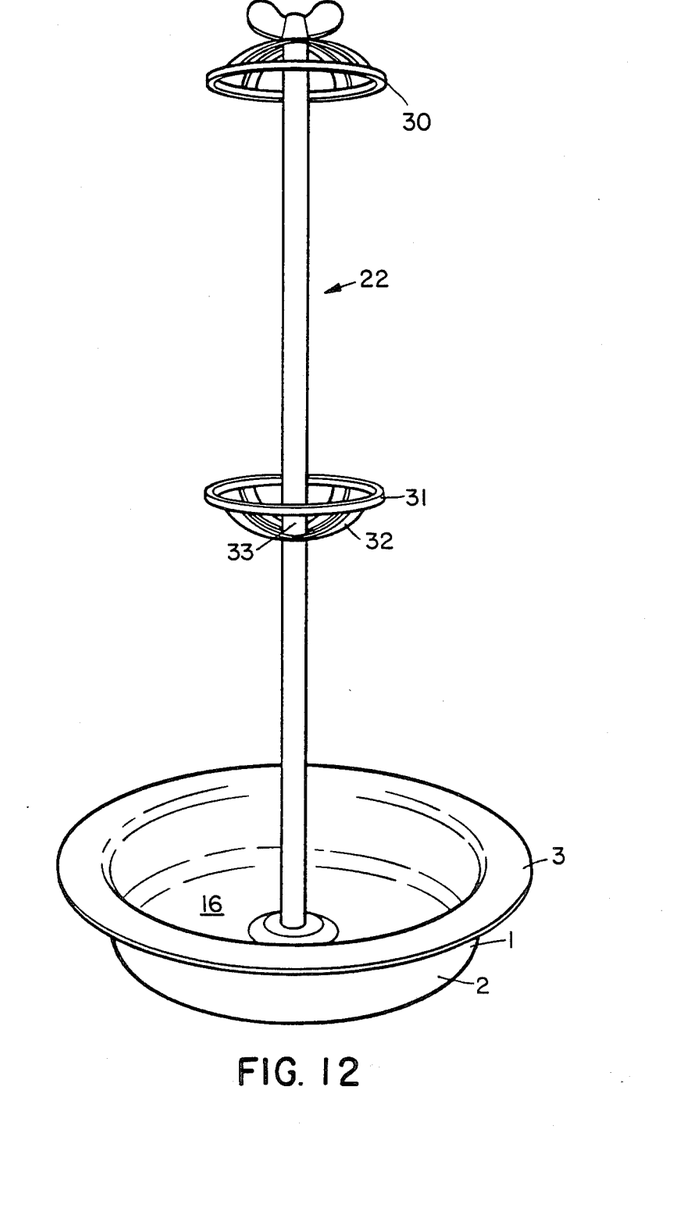
FIG. 12 is a perspective view of an eighth embodiment.
Figure 13:
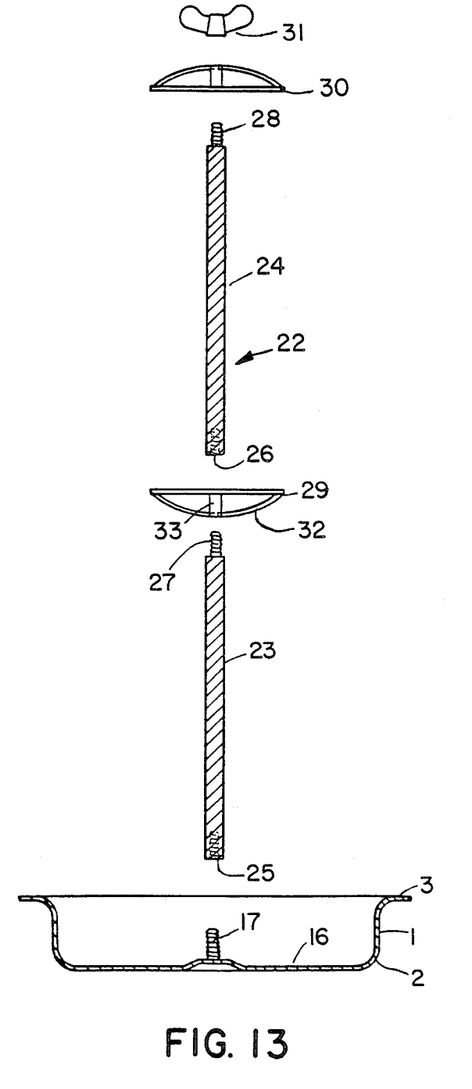
FIG. 13 is an exploded view in section of the embodiment of FIG. 12.

FIGS. 12 and 13 show a still further embodiment of the invention and again has a bowl 1, side wall 2, flange 3 and base 16 carrying a stud or screw 17. To the stud 17 there is removably attached a post 22 having a lower portion 23 and an upper portion 24. The lower and upper portions 23 and 24 are each provided with a threaded stocket 25 and 26 at their lower ends, and a threaded stem 27 and 28. Between the lower and upper portions there is clamped a holder element 29, and at the top of the upper portion there is clamped a further holder element 30 by a nut 31.

The two holder elements 29 and 30 are identical and each comprise a ring portion 31 joined by arms 32 to a central boss 33 through which the threaded portion 27 or 28 passes. In the form shown the arms 32 are radial and are preferably curved, but this is not essential, but purely radial arms or other shaped arms may be attached to the ring.

In this embodiment also the holders and rods are adapted to be dismantled for washing and cleaning purposes.

In each of the embodiments it will be seen that the holders are easily dismantled for washing and hygienic purposes and also for storage and packaging.

The claims defining the invention are as follows.
I claim:

1. A foldable chicken holder, the holder comprising a bowl having a peripheral upstanding side wall, and only one pair of elongated "U" shaped members, each "U" shaped member having a leg laterally extending from each side, the leg being releasably clipped into and pivoted to the upstanding side wall, one "U" shaped member being displaced 90 degrees with respect to the other "U" shaped member, at least the other "U" shaped member having a notch at its upper extremity, the one "U" shaped member overlapping and engaging the other "U" shaped member at the notch at the upper extremity of the other "U" shaped member releasably to retain both the "U" shaped members in position, said members forming a central upstanding member so that when a chicken is placed over the member with the legs of the chicken extending into the bowl, the chicken is supported with the interior of the chicken open so that cooking can also take place from the interior due to the hot air passing thereinto, and basting of the chicken takes place due to the juices from the chicken collecting in the bowl, whereby the pair of "U" shaped members may be folded down into a flat position or be removed from the pivotal connection for cleaning or storage purposes.

2. A chicken holder as defined in claim 1, wherein the bowl has a peripheral flange extending outwardly from the side wall, each leg being engaged in a socket formed in the peripheral flange by deforming upwardly a portion of the flange formed between a pair of parallel slits, and means to limit the extent of engagement of the legs in the socket.

3. A chicken holder as defined in claim 2 wherein the means to limit the engagement comprises an upward "Z" shaped bend in the legs.

4. A chicken holder as defined in claim 2, wherein the means to limit the engagement comprises a downward "Z" shaped bend in the legs.

5. A chicken holder as defined in claim 2, wherein the means to limit the engagement of the legs comprises deforming the legs by stamping adjacent the socket.

6. A chicken holder as defined in claim 2, wherein the means to limit the engagement comprises a stop formed on the periphereal flange outwardly of the socket.

7. A chicken holder as defined in claim 1, wherein the legs are pivoted in apertures in the side wall of the bowl.

* * * * *